US010207138B2

(12) United States Patent
Hsu

(10) Patent No.: US 10,207,138 B2
(45) Date of Patent: Feb. 19, 2019

(54) MAGNETO-RHEOLOGICAL FLUID ROTARY RESISTANCE DEVICE

(71) Applicant: GIANT MANUFACTURING CO., LTD., Taichung (TW)

(72) Inventor: Hsaio-Wen Hsu, Taichung (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 0 days.

(21) Appl. No.: 15/608,504

(22) Filed: May 30, 2017

(65) Prior Publication Data

US 2018/0036572 A1 Feb. 8, 2018

(30) Foreign Application Priority Data

Aug. 5, 2016 (TW) .............................. 105124945 A

(51) Int. Cl.
*F16F 9/53* (2006.01)
*A63B 21/00* (2006.01)
(Continued)

(52) U.S. Cl.
CPC .... *A63B 21/0056* (2013.01); *A63B 21/00845* (2015.10); *A63B 21/225* (2013.01);
(Continued)

(58) Field of Classification Search
CPC ........ A63B 21/00058; A63B 21/00069; A63B 21/00076; A63B 21/00192; A63B 21/005; A63B 21/0051; A63B 21/0052; A63B 21/0056; A63B 21/0057; A63B 21/008; A63B 21/0084; A63B 21/00845; A63B 21/22; A63B 21/222; A63B 21/225; A63B 21/4049; A63B 22/06; A63B 22/0605; A63B 2022/0635; A63B 24/0087; A63B 71/0054; A63B 2071/0063;
(Continued)

(56) References Cited

U.S. PATENT DOCUMENTS

| 5,284,330 A * | 2/1994 | Carlson | F16F 9/535 188/267.2 |
| 5,409,435 A * | 4/1995 | Daniels | A63B 21/0056 482/5 |
| 5,749,807 A * | 5/1998 | Webb | A63B 21/157 482/52 |
| 5,816,372 A * | 10/1998 | Carlson | A63B 21/0056 188/267.2 |
| 5,842,547 A * | 12/1998 | Carlson | F16D 55/00 188/267 |

(Continued)

*Primary Examiner* — Gary D Urbiel Goldner
(74) *Attorney, Agent, or Firm* — Muncy, Geissler, Olds & Lowe, P.C.

(57) ABSTRACT

A resistance device applied to relative rotations between a flywheel and an axis includes an inner stator, an outer rotor, a conductive wire and a magneto-rheological fluid. The inner stator is fixedly joined with the axis and includes an accommodating space surrounding the axis at a position away from the axis. The outer rotor, fixedly joined with the flywheel, encloses and rotates relative to the inner stator. An accommodating gap is formed between the outer rotor and the inner stator at a position away from the axis. The conductive wire is wound in the accommodating space, and generates a magnetic line passing the accommodating gap when applied by an electric current. The magneto-rheological fluid is filled in the accommodating gap. Thus, the outer rotor is disposed at the outer most region of the resistance device to increase the braking torque, and the magneto-rheological fluid is away from the axis to increase the braking moment.

5 Claims, 5 Drawing Sheets

(51) Int. Cl.
*A63B 21/22* (2006.01)
*A63B 22/06* (2006.01)
*F16D 57/00* (2006.01)
*F16F 15/16* (2006.01)
*A63B 21/005* (2006.01)
*A63B 21/008* (2006.01)

(52) U.S. Cl.
CPC ...... *A63B 21/4049* (2015.10); *A63B 22/0605* (2013.01); *F16D 57/002* (2013.01); *F16F 9/535* (2013.01); *F16F 15/16* (2013.01); *F16F 2224/045* (2013.01)

(58) Field of Classification Search
CPC .... A63B 2071/0072; A63B 2071/0081; A63B 2071/009; A63B 2209/08; F16D 57/002; F16F 9/535; F16F 15/16; F16F 2224/045
See application file for complete search history.

(56) References Cited

U.S. PATENT DOCUMENTS

| | | | |
|---|---|---|---|
| 5,896,965 A * | 4/1999 | Gopalswamy | F16D 37/02 192/21.5 |
| 6,186,290 B1 * | 2/2001 | Carlson | F16D 57/002 188/161 |
| 6,619,444 B2 * | 9/2003 | Menjak | B62D 5/04 188/162 |
| 6,681,905 B2 * | 1/2004 | Edmondson | B60G 13/001 188/130 |
| 8,397,885 B2 | 3/2013 | Shiao et al. | |
| 2002/0171067 A1 * | 11/2002 | Jolly | C10M 171/001 252/570 |
| 2005/0061601 A1 * | 3/2005 | Stefina | F16F 15/161 192/70.17 |
| 2006/0231357 A1 * | 10/2006 | Jolly | C10M 171/001 188/267.1 |

* cited by examiner

MAGNETO-RHEOLOGICAL FLUID ROTARY RESISTANCE DEVICE

FIELD OF THE INVENTION

The present invention relates to a rotary resistance device, and particularly to a magneto-rheological fluid rotary resistance device.

BACKGROUND OF THE INVENTION

A spinning bicycle is a type of exercise bicycle. A difference of a spinning bicycle from a common exercise bicycle is that, a spinning bicycle is designed to simulate an on-road bicycle, and not only brings better workout effects but also effectively boosts cardiopulmonary performance. Thus, a spinning bicycle is considered an ideal alternative solution for modern people who cannot conduct actual on-road rides. Further, a user of a spinning bicycle is allowed to carry out simulation trainings and thus obtain better results when the user actually rides on-road. In a spinning bicycle, a programmable and controllable continuous braking system is installed between a flywheel and an axis to simulate the feel of actually riding on-road. A conventional braking resistance system is a touch resistance brake, and resistance may be gradually lost due to abrasion with a braking contact plane over an extended period of use. Further, the above conventional braking resistance system provides unstable resistance and requires periodical maintenance and replacement that lead to high maintenance fees. Further, there are devices that employ an electromagnet as a resistance source. Such device, although featuring an advantage of readily adjustable resistance, is quite power consuming. Further, a resistance device employing conventional magnets lacks adjustment flexibilities although being free from the issue of power consumption.

Therefore, there is a resistance source of a resistance device in a brake that uses a magneto-rheological fluid for assisting braking. The above resistance source offers advantages of having stable resistance, no wearable consumables, readily adjustable resistance and low power consumption. The magneto-rheological fluid is a composite fluid, and includes minute magnetic particles, which has high magnetic permeability and a low hysteresis property, and a non-magnetic permeable liquid. The magneto-rheological fluid is filled in a binding gap of a rotor and a stator. When a magnetic line passes the magneto-rheological fluid, the magnetic particles are caused to be arranged and bound in a predetermined direction, in a way that the viscosity of the magneto-rheological fluid is significantly increased to brake the relative rotation between the rotor and the stator. The magneto-rheological fluid is extremely high in performance and produces almost no abrasion and replacement issues. For example, the U.S. Pat. No. 8,397,885 B2, "Magneto-Rheological Fluid Brake", discloses a magneto-rheological brake resistance device. However, the above disclosure designed with an inner rotor has unsatisfactory torque utilization efficiency and includes multi-polar magnetic coils. As a result, the above disclosure has a complicated structure, gaps present between the multi-polar magnetic coils, poor distribution of magnetic lines and inadequate magnetic permeability efficiency, hence failing to meet application requirements.

SUMMARY OF THE INVENTION

Therefore, it is a primary object of the present invention to disclose a magneto-rheological fluid rotary brake resistance device with a high braking torque.

To achieve the above object, the present invention provides a magneto-rheological rotary brake resistance device that provides a resistive force upon a relative rotation between a flywheel and an axis. The magneto-rheological rotary brake resistance device includes an inner stator, an outer rotor, a conductive line and a magneto-rheological fluid. The inner stator is fixedly joined with the axis, and is provided with an accommodating space that surrounds the axis at a position away from the axis. The outer rotor is fixedly joined with the flywheel, encloses the inner stator, and rotates relative to the inner stator. An accommodating gap is formed between the outer rotor and the inner stator at a position away from the axis. The conductive line is winded in the accommodating space, and generates a magnetic line passing the accommodating gap when applied by an electric current. The magneto-rheological fluid is filled in the accommodating gap.

With the incorporation of the outer rotor and the inner stator, the position of the outer rotor that generates the resistive force is located at outermost to provide a greater braking torque moment. Further, in the present invention, the accommodating gap is located at a position away from the axis; that is, the magneto-rheological fluid is away from the axis. Thus, when the magneto-rheological fluid exercises a viscous effect under the influence of the magnetic line and brakes the relative rotation between the flywheel and the axis, a greater braking torque moment is generated to provide a better braking effect.

DETAILED DESCRIPTION OF THE PREFERRED EMBODIMENTS

Details and technical features of the present invention are given with the accompanying drawings below.

Figure 1:
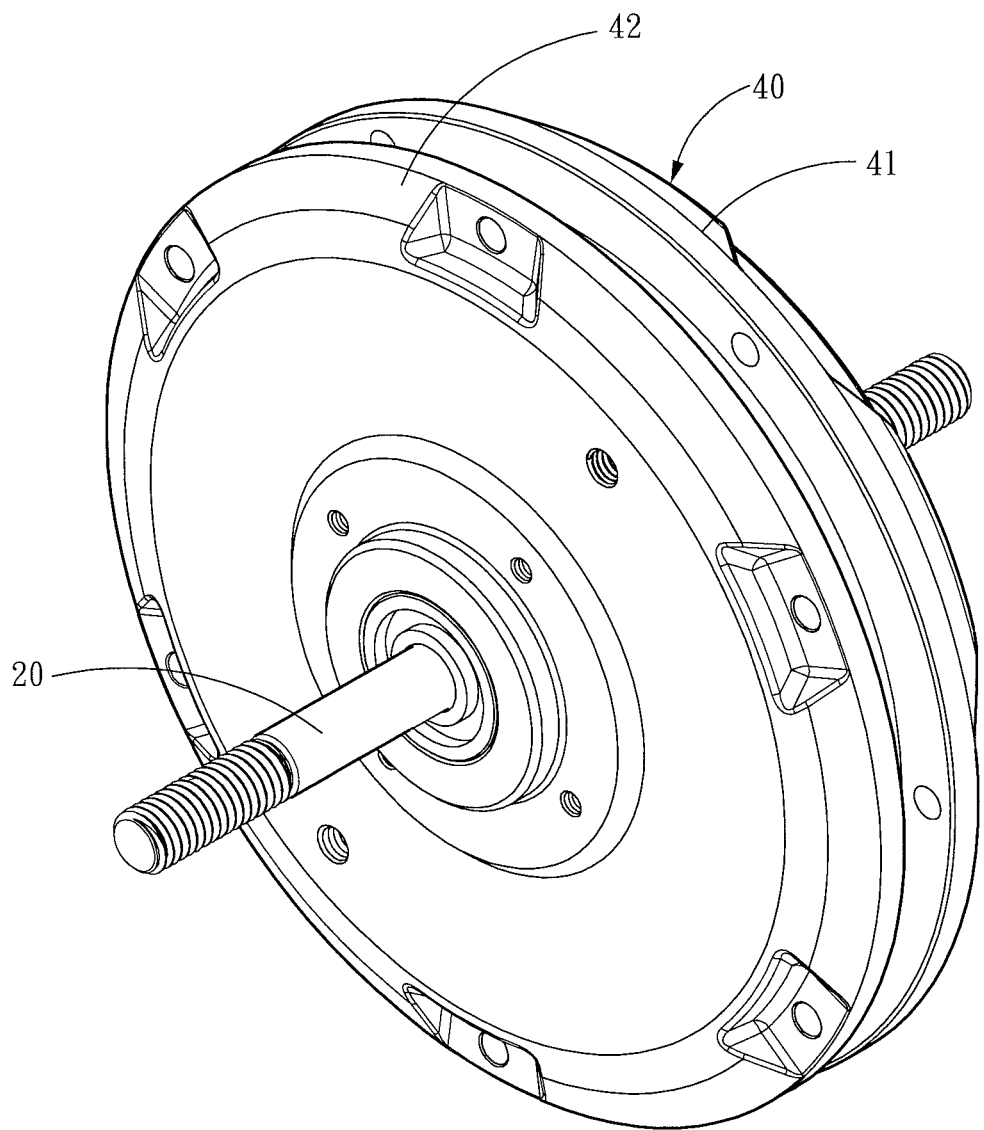
FIG. 1 is a perspective appearance diagram according to a preferred embodiment of the present invention.
Figure 2:
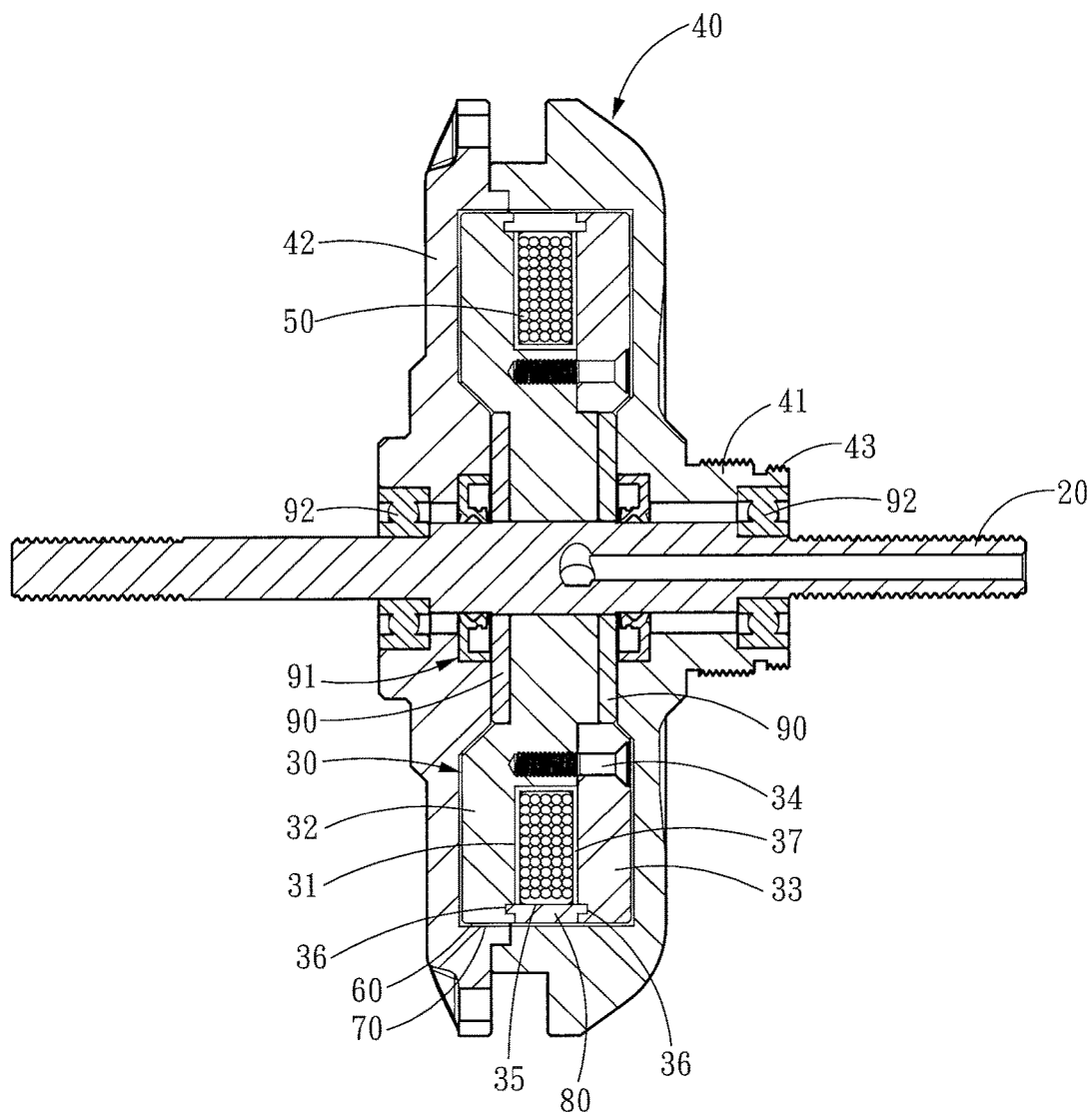
FIG. 2 is a section structural diagram according to a preferred embodiment of the present invention.
Figure 3:
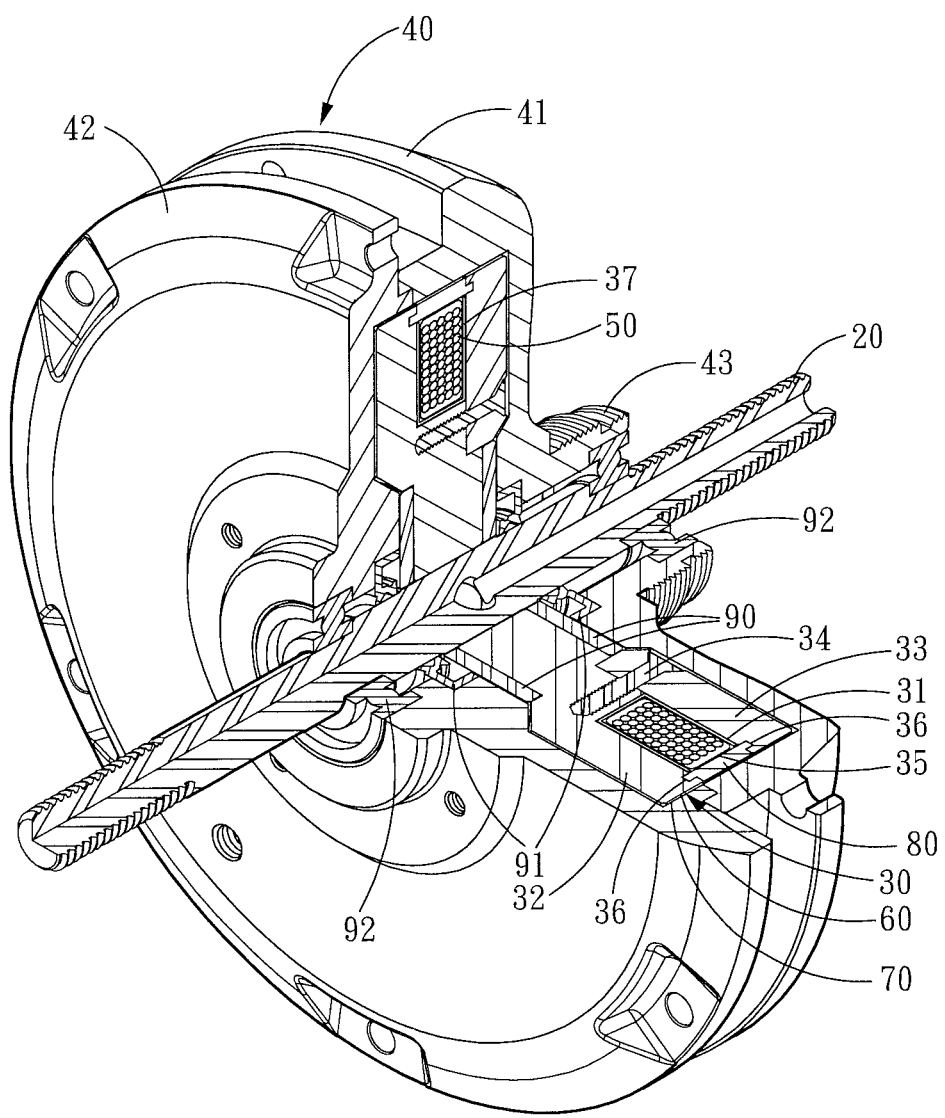
FIG. 3 is a partial perspective section structural diagram according to a preferred embodiment of the present invention.

FIG. 1, FIG. 2 and FIG. 3 show a perspective appearance diagram, a section structural diagram and a partial perspective section structural diagram according to a preferred embodiment of the present invention. Referring to FIG. 1 to FIG. 3, the present invention provides a magneto-rheological fluid rotary resistance device applied to brake a relative rotation between a flywheel (not shown) and an axis 20. The magneto-rheological fluid rotary resistance device includes an inner stator 30, an outer rotor 40, a conductive line 50 and a magneto-rheological fluid 60. The inner stator 30 is fixedly joined with the axis 20, and is provided with an accommodating space 31 that surrounds the axis 20 at a position away from the axis 20.

In practice, the inner stator 30 may include a fixed portion 32 and a fastening portion 33. The fixed portion 32 is fixedly joined with the axis 20. The fastening portion 33 is fixed to the fixed portion 32 using at least one fastening element 34. The accommodating space 31 is formed between the fixed portion 32 and the fastening portion 33. As such, the inner stator 30 may be formed as an assembly to reduce manufacturing complications.

The outer rotor 40 encloses the inner stator 30, and rotates relative to the inner stator 30. More specifically, the outer rotor 40 is directly connected to a curved crank (not shown) that a user pedals, and is driven by the rotational force as the user pedals. Alternatively, the outer rotor 40 is driven to rotate through an indirect connection means of a chain or a linked band. Similarly, for manufacturing possibilities, the outer rotor 40 may include a first disc 41 and a second disc 42. The first disc 41 and the second disc 42 cover and enclose at the two sides of the inner stator 30 and are fixedly joined. Further, the first disc 41 includes a screw fastening structure 43, through which the first disc 41 may be directly connected to the curved crank (not shown) that a user pedals, such that the outer rotor 40 is driven to rotate by the rotational force as the user pedals. Alternatively, the outer rotor 40 may be driven to rotate through an indirect connection means of a chain or a linked band.

Figure 5:
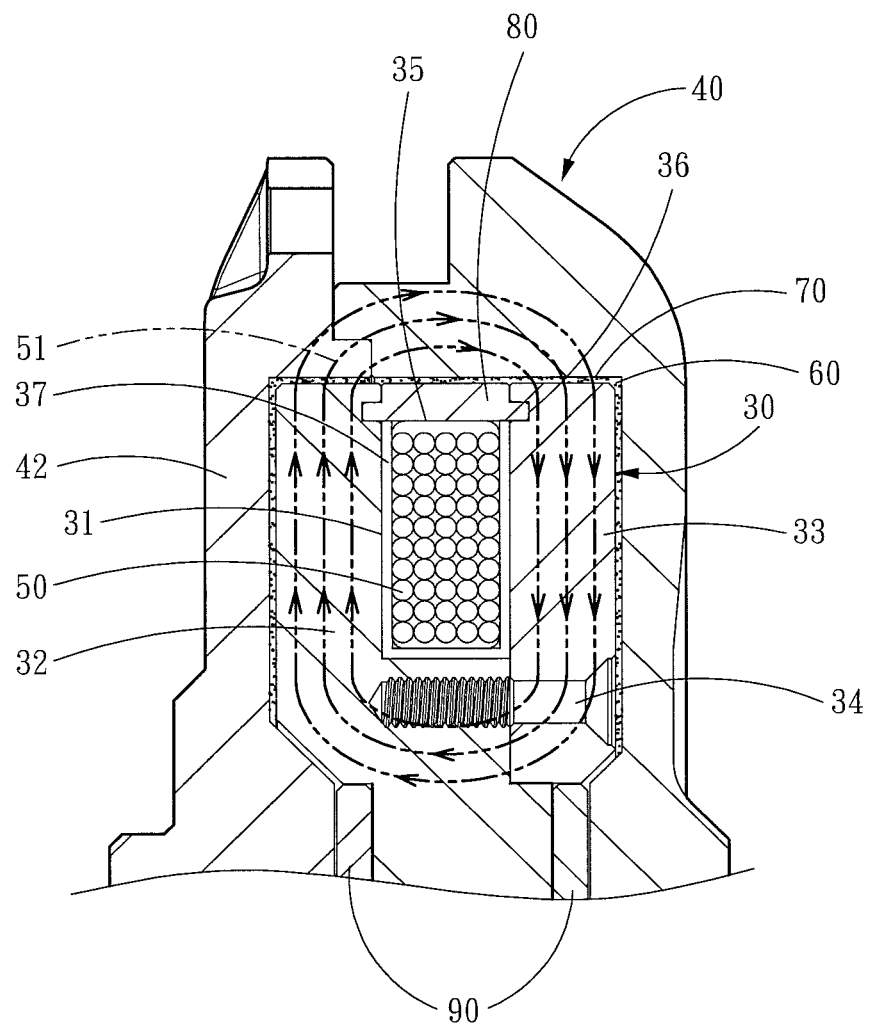
FIG. 5 is a schematic diagram of effects of a magnetic line according to a preferred embodiment of the present invention.

At a position away from the axis 20, an accommodating gap 70 is formed between the outer rotor 40 and the inner stator 30, and the magneto-rheological fluid 60 is filled in the accommodating gap 70. The conductive line 50 is winded in the accommodating space 31, and generates a magnetic line 51 (as shown in FIG. 5) that encircles in the accommodating gap 70 when applied by an electric current. In practice, the conductive line 50 may be implemented by an enamel insulated wire, which is winded in the accommodating space 31 with respective to the axis 20.

Away from the axis 20, the accommodating space 31 is provided with an opening 35 in communication with the accommodating gap 70. A magnetic baffle plate 80 for sealing the opening 35 is disposed at the opening 35. To enlarge an effective range of the magnetic line 51, the width of the magnetic baffle plate 80 may be larger than the width of the conductive line 50, so as to force the magnetic line 51 to bypass the magnetic baffle plate 80 to increase the region where the magnetic line 51 encircles the accommodating gap 70. Thus, the magnetic line 51 is prevented from choosing a shortest route instead of passing the position of accommodating gap 70, hence eliminating the issue that the magneto-rheological fluid may fail to fully exercise the magnetic force for generating a resistive force. Further, when the inner stator 30 is assembled from the fixed portion 32 and the fastening portion 33, each of the fixed portion 32 and the fastening portion 33 may include a notch 36. Through the opening 35, the fixed portion 32 and the fastening portion 33 may fasten and position the magnetic baffle plate 80, while contact areas of the fixed portion 32, the fastening portion 33 and the magnetic baffle plate 80 may be increased to securely seal the opening 35 of the accommodating space 31 and to prevent the magneto-rheological fluid 60 from seeping into the accommodating space 31 via the accommodating gap 70.

To prevent the magneto-rheological fluid 60 from seeping out and to allow the outer rotor 40 with a good degree of freedom for rotation, two sides of the inner stator 30 and between the inner stator 30 and the outer rotor 40 may be disposed with a spacing ring 90 and a sealing member 91 sealing the accommodating gap 70, respectively. The spacing ring 90 maintains the gap between the inner stator 30 and the outer rotor 40, and further prevents an issue of relative displacement between the inner stator 30 and the outer rotor 40 with respective to the axial direction. The sealing member 91 prevents the magneto-rheological fluid 60 from seeping out. Further, a bearing 92 may be disposed between each of the two sides of the outer rotor 40 and the axis 20. The bearing 92 allows the outer rotor 40 to freely rotate relative to the axis 20.

Figure 4:
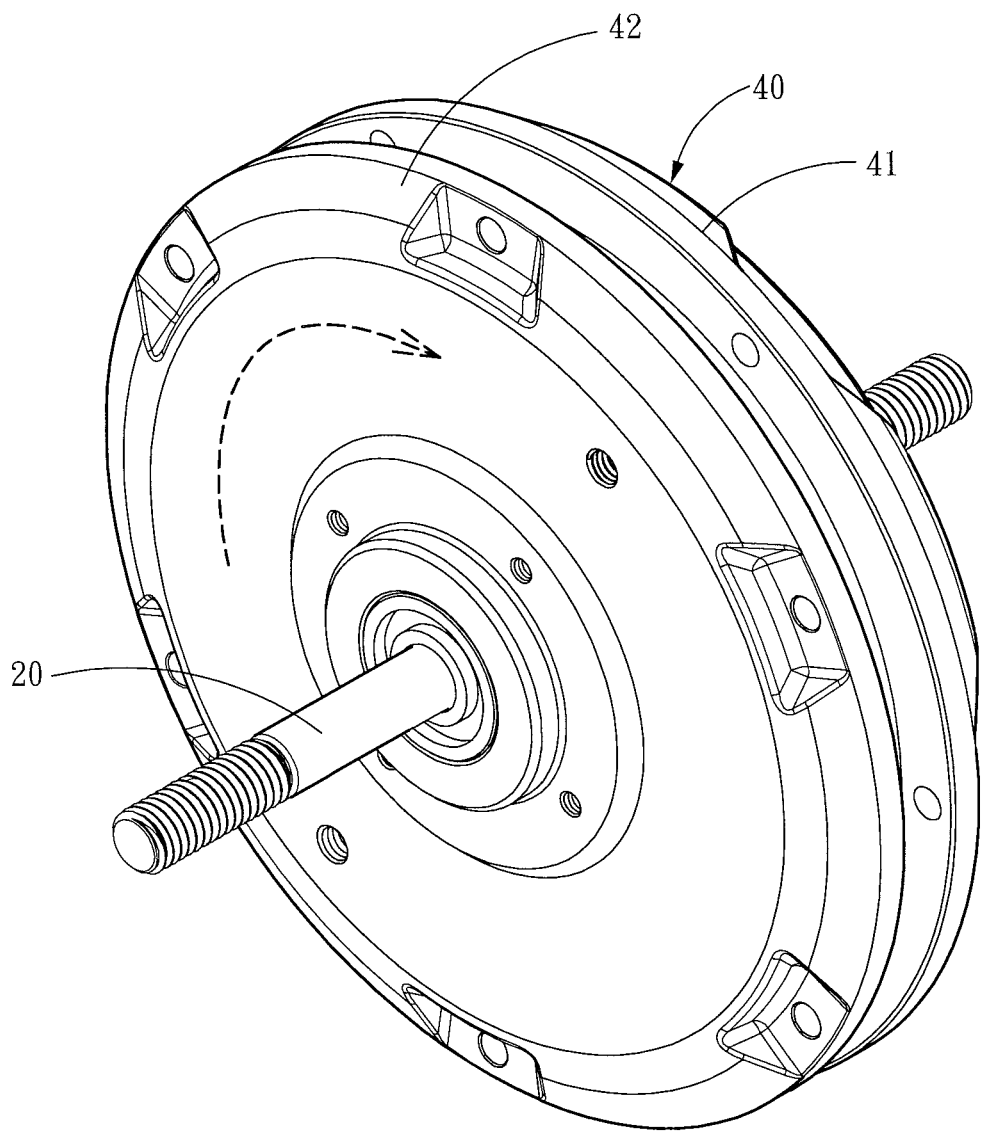
FIG. 4 is a schematic diagram of rotation according to a preferred embodiment of the present invention.

Referring to FIG. 4 and FIG. 5, before the present invention takes effect, the flywheel (not shown) rotates relative to the axis 20; that is, the outer rotor 40 is in a rotating state (as shown in FIG. 4). To apply the brake, the conductive line 50 is applied by an electric current to generate the magnetic line 51 (as shown in FIG. 5). The magnetic line 51 passes the accommodating gap 70, and the magneto-rheological fluid 60 then becomes orderly arranged under the influence of the magnetic line 51 to generate a viscosity property. As such, the outer rotor 40 receives a resistive force. In order to overcome this resistive force, the user is required to apply a larger pedaling force through the pedal (not shown); that is, the feel of riding uphill is simulated. The size of the resistive force may be changed along with the magnetic flux of the magnetic line 51. That is to say, by controlling the value of the electric current of the conductive line 50, the resistive force may be controlled to simulate conditions of different terrains. Further, the present invention may also be applied as a brake control mechanism of common wheel motions, so as to prevent issues of abrasion caused by physical contact and periodic replacement of related consumables.

In conclusion, as opposed to the prior art, the present invention provides at least following advantages.

1. With the incorporation of the outer rotor and the inner stator, the outer rotor is disposed at the outermost to provide a larger braking torque.

2. By locating the accommodating gap at a position away from the axis, when magneto-rheological fluid exercises a viscous effect under the influence of the magnetic line, a larger moment is generated to provide a better braking effect.

3. Through the magnetic baffle plate, the magnetic line is better distributed to increase an effective region of the magneto-rheological fluid and to enhance the braking effect.

4. By sealing the opening with the magnetic baffle plate, the magneto-rheological fluid is prevented from seeping into the accommodating space.

What is claimed is:

1. A magneto-rheological fluid rotary resistance device, for braking a relative rotation between a flywheel and an axis, comprising:
an inner stator, fixedly joined with the axis, provided with an accommodating space that surrounds the axis at a position away from the axis;
an outer rotor, fixedly joined with the flywheel, enclosing the inner stator and rotating relative to the inner stator, wherein an accommodating gap is formed between the outer rotor and the inner stator at a position away from the axis;
a conductive line, wound in the accommodating space, generating a magnetic line passing the accommodating gap when applied by an electric current; and
a magneto-rheological fluid, filled in the accommodating gap,
wherein the accommodating space comprises an opening in communication with the accommodating gap in a direction away from the axis, and a magnetic baffle plate for sealing the opening is disposed at the opening.

2. The magneto-rheological fluid rotary resistance device of claim 1, wherein the inner stator comprises a fixed portion and a fastening portion, the fixed portion is fixedly joined with the axis, the fastening portion is fixed to the fixed portion using at least one fastening element, and the accommodating space is formed between the fixed portion and the fastening portion.

3. The magneto-rheological fluid rotary resistance device of claim 1, wherein two spacing rings are respectively disposed on two sides of the inner stator, and two sealing members for sealing the accommodating space are respectively disposed on a side of each of the spacing rings adjacent to the outer rotor.

4. The magneto-rheological fluid rotary resistance device of claim 1, wherein a bearing is disposed between the axis and each of two sides of the outer rotor.

5. The magneto-rheological fluid rotary resistance device of claim 1, wherein the outer rotor comprises a first disc and a second disc, the first disc and the second disc respectively cover and enclose the inner stator at two sides of the inner stator and are fixedly joined, and the first disc comprises a screw fastening structure for fastening to the flywheel.

\* \* \* \* \*